United States Patent

Yeh et al.

[15] 3,692,147
[45] Sept. 19, 1972

[54] BRAKE SYSTEM USING VEHICLE'S OWN KINETIC ENERGY TO CONTROL THE BRAKE AND THE DEVICE THEREOF

[72] Inventors: Chin-Jung Yeh, No. 307, Chung Cheng Rd, Hua-Lien; Yu-Chi Yang, No. 3, Lane 196, Lin-Sen Rd., both of Taiwan, China /Taiwan

[22] Filed: April 9, 1971

[21] Appl. No.: 132,866

[52] U.S. Cl. ................................. 188/2 R, 188/152
[51] Int. Cl. ................................................. B60t 1/06
[58] Field of Search .188/2 R, 16, 152, 181 R, 181 T; 303/3

[56] References Cited

UNITED STATES PATENTS

| | | | |
|---|---|---|---|
| 2,959,449 | 11/1960 | Lazich | 188/2 R X |
| 3,340,968 | 9/1967 | Lepelletier | 188/152 |

Primary Examiner—Evon C. Blunk
Assistant Examiner—Johnny D. Cherry
Attorney—Robert E. Burns and Emmanuel J. Lobato

[57] ABSTRACT

Disclosed herein is a brake system for a vehicle, wherein the kinetic energy of the vehicle is used to control the brake. An auxiliary brake wheel, and an intermediate high pressure oil cylinder connected with the brake wheel by a link and piston rod assembly, are fitted between a brake master cylinder in the hydraulic brake system and an oil passage which distributes the brake fluid to the joints of branch oil tubes of various brake wheels. The auxiliary brake wheel is fitted to the end of the vehicle transmission shaft; the auxiliary brake wheel uses an angular displacement of its braking disc, upon application of the brakes, to produce a rectilinear motion of the link and piston rod assembly, thereby further pressurizing the high pressure oil cylinder; and the high pressure oil cylinder is connected by fluid lines to each of the vehicle wheels, so that a strong, fast-acting, and efficient braking effect is obtained.

7 Claims, 5 Drawing Figures 3,692,147

BRAKE SYSTEM USING VEHICLE'S OWN KINETIC ENERGY TO CONTROL THE BRAKE AND THE DEVICE THEREOF

BACKGROUND OF THE INVENTION

It is well known that in a conventional oil pressure type vehicular brake system, braking power is generated directly by the friction produced by the engagement between the brake lining and brake drums. This engagement results from movement of the brake shoes which are forced outwardly by oil pressure from said brake master cylinder which actuates the piston of each brake cylinder. The friction is proportional to the positive pressure on the brake linings and the system is orginally designed with sufficient power to stop a moving vehicle to which it is applied, but, in practice, the braking efficiency of a vehicle drops as its load or speed increases. Also, the pressure of a brake cylinder is produced by the stepping force of the driver's foot, and this pressure is limited under a heavy load, or at a very high speed, or when oil or water permeates into the brake wheel, so that the friction is not always sufficient to overcome the torque produced by the brake drum in the required time. As a result, although the brake lining has been pressed tightly on said brake drum, the latter keeps slipping on the former without timely and effective generation of a brake action. One approach to eliminating this defect is to increase the braking power by adapting a brake cylinder to provide a very high oil pressure, or by adding a high pressure oil cylinder in the brake system. However, by so doing the pressure will be too high to be actuated by the stepping force alone, so that a vacuum pump or other complicated device has to be provided to supplement the stepping force. Owing to the high cost and frequent malfunctions of such devices, in addition to their inoperability when the engine is not running, such devices are undesirable. Some vehicles have pneumatic brakes, the transmission whose pressure is certainly more speedy than that of a hydraulic brake, but it also has the disadvantages of high cost, frequent malfunctions and being non-operative when the engine is not running.

An object of the present invention is to provide a system and braking device for eliminating the defects mentioned above and to provide a safe, effective brake system, which utilizes the kinetic energy of a vehicle to actuate a high pressure oil cylinder, and which provides simultaneous brake actions through both the wheels and the transmission shaft with a very high braking power.

SUMMARY OF THE INVENTION

In accordance with the invention there is provided a power brake system and device in which an auxiliary brake wheel is connected to the drive shaft of a vehicle for actuation to provide power for operating a conventional brake system of the vehicle. In particular, the auxiliary brake wheel has a braking disc which is rotationally displaced upon actuation by the master cylinder of the vehicle. This displacement is converted into a linear movement for operating the piston of a high pressure cylinder which is connected to pressurize the conventional hydraulic lines coupled to the vehicle wheel brakes, wherein the oil for such pressurization is obtained from the master cylinder.

Thus, according to the present invention, the brake system has the following features:

1. Since the high pressure oil cylinder is driven by the auxiliary brake wheel fitted on the transmission shaft, as soon as the transmission shaft rotates, a safe and reliable brake action is instantaneously available, so that the braking system does not depend on the operation of the engine.

2. Compared with the general four-wheel brake system, the braking efficiency of the instant system is unusually high due to the action of the auxiliary brake wheel connected to the transmission shaft.

3. Low pressure oil is used to control the auxiliary brake wheel which is used, in turn, to convert the torque of the transmission shaft for driving the high pressure oil cylinder to control the braking of all wheels of the vehicle. The operation is fast acting and has no injurious effect on the drive apparatus of the vehicle.

4. The resultant braking power is so great as to significantly alleviate the ill effects of oil or water which has permeated into the space between the contact surfaces of the brake drum and brake lining.

5. In case the auxiliary brake wheel and/or the high pressure oil cylinder malfunction, the vehicle can still depend upon the conventional brake system provided on said vehicle.

6. The system is more sensitive and lighter than the conventional power brake devices; its response is fast acting; and the driver will find it very easy to control.

7. It is simple in construction, of low production cost, easy to repair and maintain, and has a high safety factor and very few malfunctions.

8. It can be installed or replaced easily on any existing vehicles or trailers, heavy-duty or light-duty, which are provided with a hydraulic brake device, without impairing the performance of auto parts.

9. Since the brake system according to the present invention generates braking power whenever the vehicle moves, attachments of such brake devices to a motor vehicle and several trailers will offer safe and reliable braking power so that "train-on-the-highway" concepts will become possible and practicable.

BRIEF DESCRIPTION OF THE DRAWINGS:

The attached drawings illustrate a preferred embodiment of the kinetic energy system and its device according to the present invention.

In such drawings.

Figure 1:
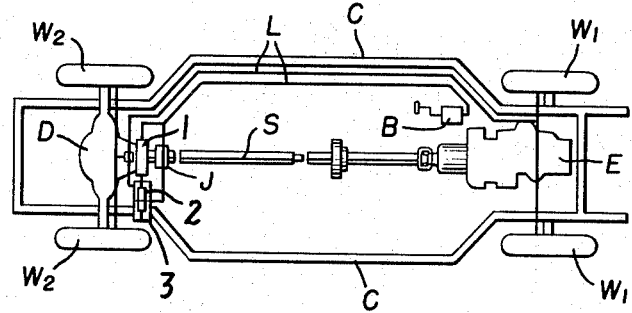
FIG. 1 shows the relative positions of the elements of a brake system according to the present invention, wherein the system is connected to a chassis and transmission shaft of a vehicle.

DETAILED DESCRIPTION OF PREFERRED EMBODIMENT:

The arrangement of a brake device according to the present invention is shown in FIG. 1, wherein B denotes a brake master cylinder; 1, an auxiliary brake wheel; 2, a high pressure oil cylinder; 3, a link assembly for connecting the auxiliary brake wheel 1 to the high pressure oil cylinder 2; E, an engine; C, a chassis; D, a differential gear box; S, a transmission shaft; J, a universal joint; W1 and W2, front and rear brake wheels; and L, tubing providing hydraulic lines for interconnecting the brake system. The auxiliary brake wheel 1 is fitted to the end of transmission shaft S, forwardly of the differential gear box D, so that its brake drum can rotate along with said transmission shaft S. The high pressure oil cylinder 2 is placed above the rear spring or on the chassis and connected with the auxiliary brake wheel by means of the link assembly 3.

Figure 2:
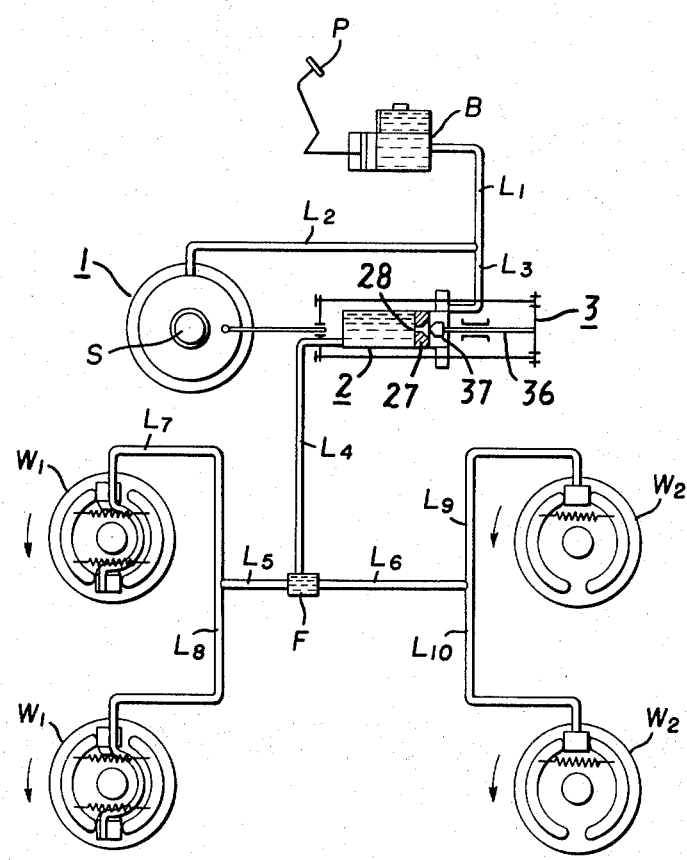
FIG. 2 is a diagram illustrating the hydraulic tubing of a brake system according to the present invention.

The hydraulic lines and wiring system of the brake device are shown in FIG. 2 which illustrates the departure from a general brake system due to the provision of the auxiliary brake wheel 1 and the intermediate high pressure oil cylinder 2 connected thereto by the link assembly 3. The cylinder 2 is coupled between the master cylinder B and an oil passage which distributes the brake fluid to the joints F of branch oil tubes of the brake wheels W1 and W2 separately, while an oil passage L1 is led from the master cylinder B and divided into two passages; one passage L2 connected to the auxiliary brake wheel 1, and another passage L3 connected to the low pressure side of the high pressure oil cylinder 2; and, furthermore, an oil passage L4 connected to the high pressure side of said high pressure oil cylinder 2 is attached to the joint F of the branch oil tubes, and oil passages L5 and L6 are coupled out of said branch tube joint F and connected separately through oil passages L7, L8; and L9, L10 to the rear and front brake wheels W1 and W2.

Figure 3:
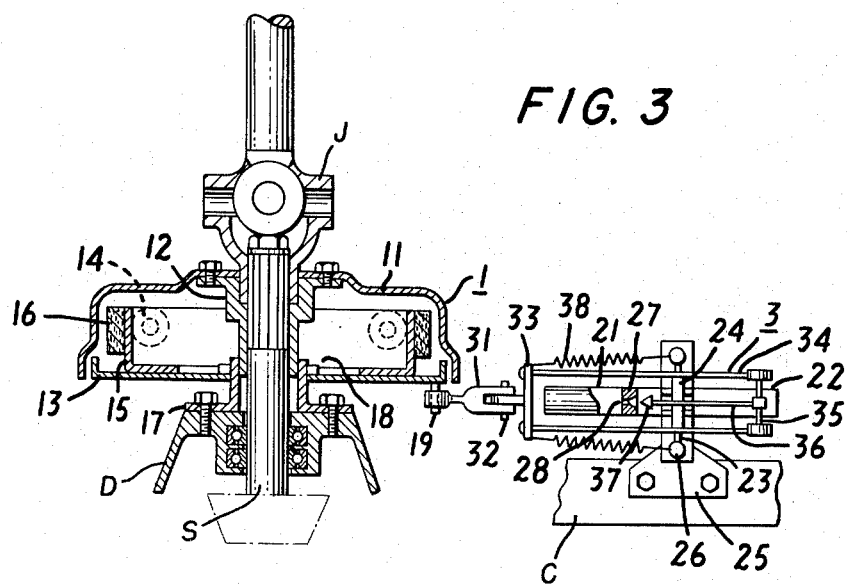
FIG. 3 is a cross-sectional top view of the relationship between an auxiliary brake wheel and a high pressure oil cylinder according to the invention.
Figure 4:
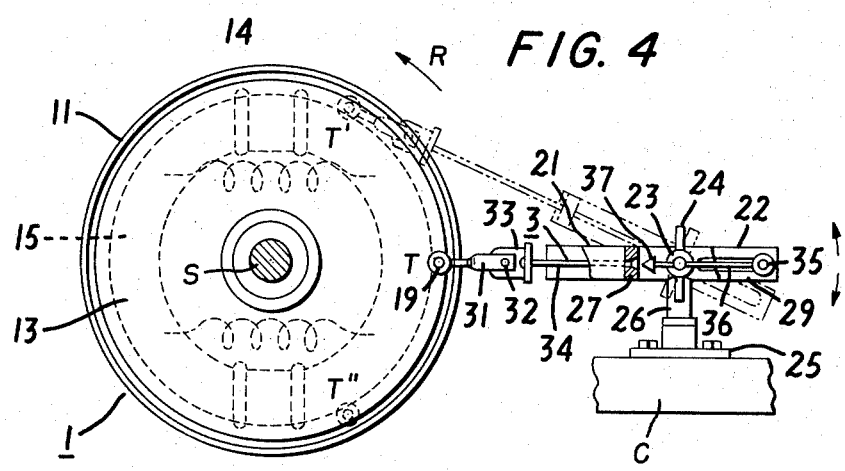
FIG. 4 is a cross-sectional side view of the auxiliary brake wheel and oil cylinder shown in FIG. 3.

The construction of the auxiliary brake wheel 1, high pressure oil cylinder 2, and link assembly 3, are shown in FIGS. 3 and 4. A brake drum 11 of the auxiliary brake wheel is fixedly connected by bolts to a splined sleeve 12 which engages a splined portion of the transmission shaft S between the differential gear box D and the universal joint. Thus, the brake drum 11 rotates along with said transmission shaft S. A brake cylinder 14 is fitted at the inner wall surface of a disc 13 having a brake shoe 15 and lining 16 assembly mounted thereon, said disc being slidably received over the cylindrical portion of a flange plate 17 by means of a central opening to maintain a proper gap between the brake lining 16 and the interior periphery of the brake drum 11. The base of the flange plate 17 is secured to the front surface of the gearbox D as by screws, and a ring-type nut 18 is locked in a threaded portion on the outside of a shaft-like projection of the flange plate 17, so that the disc 13 is held against axial movement, but is permitted to move rotationally on said shaft-like projection. On the periphery of an outside wall of the disc 13, that is, on the side facing the gearbox, there is fixed a pivot lug 19 which is connected with the link assembly 3 through a U-shaped fork lever 31 pivoted thereto.

The cylinder block 21 of the high pressure oil cylinder 2 is secured at one side of a movable supporting plate 24 having a guide cylinder 22 secured at its other side, said plate 24 having a pair of short shafts 23 connected at opposed lateral edges thereof. The cylinder block 21 is aligned with guide cylinder 22, and said short shafts 23 are received respectively in bearings 26 which are provided on a stationary plate 25. In such a construction, when the movable supporting plate 24 rotates with the short shaft 23 as center, the cylinder block 21 will also rotate along with it. The stationary plate 25 is fixed with screws or by other means at the under side of a rear spring or to an appropriate position on the chassis C. A piston 27 is received in the cylinder block 21 and has an oil valve opening 28 in the center thereof. The oil tubes L3 and L4, which lead to said brake master cylinder B and said joint F respectively, as shown in FIG. 2, are connected to opposed ends of the cylinder block 21.

The link assembly 3 has a U-shaped fork lever 31 connected to the disc 13 of the brake wheel. Said fork lever 31 is pivotally connected to a plate 33 by a pin 32, and a pair of parallel guide bars 34 are fixed at their one ends to the plate 33 and at their opposed ends to a shaft 35. The intermediate portion of each guide bar 34 passes through said movable supporting plate 24, and shaft 35 passes through a guide groove 29 of said guide cylinder 22. In the cavity of said guide cylinder is fitted a piston rod 36, one end of which is projectable into the cylinder block 21, and the other end of which is fixed at the center of said short shaft 35. The end of said rod 36 which extends into the cylinder block 21 is provided with a valve plug 37 that, when the guide bar 34 moves forward, blocks the oil hole 28 of said piston 27. Coil springs 38 are suspended at corresponding positions between the movable supporting plate 24 and the plate 33 to cause the disc 13 to return to its original state after braking.

Figure 5:
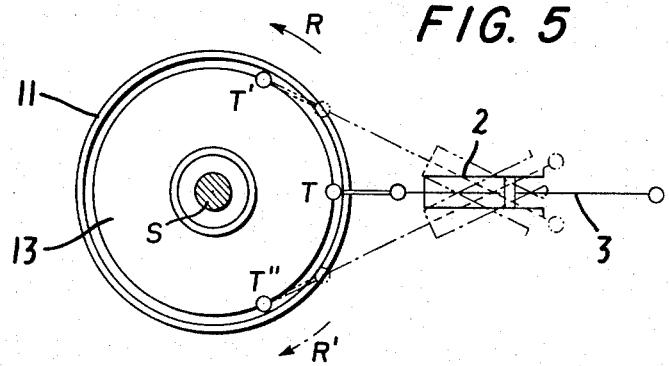
FIG. 5 is schematic illustration of the operation of the auxiliary brake wheel and high pressure oil cylinder.

In the operation of the system, when the brake pedal P is stepped down, the oil pressure in said master cylinder B is conveyed to the auxiliary brake wheel 1 and the high pressure oil cylinder 2, respectively, through oil passage L1 and then through the two oil passages L2 and L3; at this instance, since the orifice 28 of the piston 27 in said high pressure oil cylinder 2 is in an open state and not yet blocked by the valve 37, the pressurized oil from the oil passage L3 passes directly through the hole 28 via cylinder block 21, oil passage L4, and the joint F of the branch oil tube and is further divided into two passages L5, L6 and enters the brake cylinders of the rear and front brake wheels W1, W2 through oil passages L7, L8, and L9, L10, respectively, thus causing the five brake wheels 1, W1, W1, W2 and W2 to start operating simultaneously. When the auxiliary brake wheel 1 starts its braking action and forces the brake lining 16 to press against the brake drum 11, which rotates together with the transmission shaft S, an extremely large torque is produced by the friction generated between said brake lining 16 and said brake drum 11. This frictional torque is impressed on the disc 13 which immediately rotates and actuates the fork lever 31. Once the fork lever 31 rotates together with said disc 13, the guide bars 34 connected with said fork lever 31 through a connecting plate 33 will be pulled, thereby causing the cylinder block 21 and said guide cylinder 22 to pivot about the short shaft 23. Movement of the guide bars 34 and the change in position of said cylinder block 21 causes the piston rod 36 to advance and come into contact with the piston 27 to block the oil hole 28 therein, and to push said piston 27 to further pressurize the oil in the cylinder block 21. The resultant high pressure of the oil is transmitted to the brake cylinders of wheels W1, W2, producing an extremely large braking power on those wheels. This latter described relationship of the high pressure oil cylinder 2 and the link assembly 3 with the disc 13 are shown in FIGS. 4 and 5, wherein the solid line indicates the related positions of the components before actuation, and the dashed lines show the auxiliary brake wheel when fully actuated. When the brake pedal is stepped down to actuate the auxiliary brake wheel, the disc 13 will rotate so that the lug 19 moves from position T along the direction of rotation of the transmission shaft (R) toward the position T', thus actuating the high pressure oil cylinder. When the vehicle is driven backward, the disc 13 will rotate according to the direction of the arrowhead R' and move from position T to position T''. The angular displacement of disc 13 should be within $+90°$ to $-90°$. When the brake pedal is released, the high pressure oil will flow back and the brake disc 13, link assembly 3, and high pressure oil cylinder 21 will be pulled back to their original positions by the force of the springs 38.

In the brake device according to the present invention, as the high pressure oil cylinder is actuated by the rotation torque of the transmission shaft, potential braking power is available as soon as the transmission shaft rotates. Hence, the operating state of the engine is irrelevant, and since the rotation torque of the transmission shaft is extremely large and proportional to the momentum of the vehicle in question, the braking power available with this system is also very large. Furthermore, during braking action, the auxiliary brake wheel acts on the drive shaft at the same time as the functioning of the wheel brakes, so that the system has the combined function of both hand and foot brakes, without the disadvantages which usually result from the use of a hand brake while the car is in motion wherein accidents and damage to gears in the differential gearbox often occur.

What is claimed:

1. In a braking system for a vehicle having a drive shaft, a plurality of wheels, a plurality of fluid-pressure actuable braking devices connected respectively to said wheels, and a brake actuating device, an improvement comprising an auxiliary braking wheel connected to said drive shaft for rotation thereby, means connecting said brake actuating device to said auxiliary braking wheel, said auxiliary braking wheel including disc means for rotational displacement in response to simultaneous rotation of said drive shaft and operation of said brake actuating device, linkage means coupled to said disc means for converting said rotational displacement into a linear displacement, and fluid compressing means connected to said linkage means and said fluid-pressure actuable braking devices for actuating said braking devices in response to said linear displacement.

2. An improved braking system as set forth in claim 1, in which said fluid compressing means includes a high pressure oil cylinder and first piston combination, and first oil conduit means connected between said high pressure cylinder and said braking devices, and in which said linkage means is connected to said piston for increasing an oil pressure in said oil conduit means in response to said linear displacement of said linkage means.

3. An improved braking system as set forth in claim 2, in which said brake actuating device includes a master oil cylinder and second piston combination, and a brake pedal coupled thereto for operating said second piston, wherein said high pressure cylinder has a high pressure end and a low pressure end, said first oil conduit means is connected to said high pressure end, second oil conduit means are connected between said master cylinder and said low pressure end of said high pressure cylinder, said first piston has walls defining an axial orifice therethrough providing a passage between said high and low pressure ends of said high pressure cylinder, and said linkage means includes valve means within said high pressure cylinder for closing said orifice in response to linear displacement of said linkage means.

4. An improved braking system as set forth in claim 1, in which said auxiliary braking wheel includes a brake drum connected to said drive shaft for rotation therewith, said disc means includes a disc plate, brake shoes movably mounted on said disc plate, and brake linings fixed on said brake shoes, and further comprising means coupled to said brake actuating device for urging said brake shoes outwardly on said disc plate to bring said brake linings into engagement with said drum upon operation of said brake actuating device, means mounting said disc plate for rotation with respect to and coaxially with said drive shaft, and pivot means connecting said linkage to said disc plate.

5. An improved braking system as set forth in claim 4, in which said fluid compressing means includes a high pressure oil cylinder and first piston combination, and first oil conduit means connected between said high pressure cylinder and said braking devices, and in which said linkage means is connected to said piston for increasing an oil pressure in said oil conduit means in response to said linear displacement of said linkage means.

6. An improved braking system as set forth in claim 5, in which said brake actuating device includes a master oil cylinder and second piston combination, and a brake pedal coupled thereto for operating said second piston, wherein said high pressure cylinder has a high pressure end and a low pressure end, said first oil conduit means is connected to said high pressure end, second oil conduit means are connected between said master cylinder and said low pressure end of said high pressure cylinder, said first piston has walls defining an axial orifice therethrough providing a passage between said high and low pressure ends of said high pressure cylinder, and said linkage means includes valve means within said high pressure cylinder for closing said orifice in response to linear displacement of said linkage means.

7. In a braking device for a vehicle having a plurality of wheels and a brake actuating device, in which kinetic energy of the vehicle is converted into braking power therefor, an improvement comprising an auxiliary braking wheel, means mounting said auxiliary braking wheel on said vehicle for rotation in response to rotation of said vehicle wheels, said auxiliary braking wheel including means for selectively exerting a friction force to impede rotation of said vehicle wheels, and means operatively connecting said brake actuating device to said means for exerting a friction force for causing said exertion of a friction force in response to operation of said brake actuating device.

* * * * *